(12) United States Patent
Rafii

(10) Patent No.: US 11,783,813 B1
(45) Date of Patent: Oct. 10, 2023

(54) METHODS AND SYSTEMS FOR IMPROVING WORD DISCRIMINATION WITH PHONOLOGICALLY-TRAINED MACHINE LEARNING MODELS

(71) Applicant: Abbas Rafii, Palo Alto, CA (US)

(72) Inventor: Abbas Rafii, Palo Alto, CA (US)

( * ) Notice: Subject to any disclaimer, the term of this patent is extended or adjusted under 35 U.S.C. 154(b) by 0 days.

(21) Appl. No.: 17/872,662

(22) Filed: Jul. 25, 2022

Related U.S. Application Data

(63) and a continuation-in-part of application No. 17/246,673, filed on May 2, 2021.

(60) Provisional application No. 63/227,853, filed on Jul. 30, 2021.

(51) Int. Cl.
*G10L 15/16* (2006.01)
*G10L 25/90* (2013.01)
*G10L 15/02* (2006.01)

(52) U.S. Cl.
CPC .............. *G10L 15/16* (2013.01); *G10L 15/02* (2013.01); *G10L 25/90* (2013.01); *G10L 2015/025* (2013.01)

(58) Field of Classification Search
CPC ......... G10L 15/16; G10L 15/02; G10L 25/90; G10L 2015/025
See application file for complete search history.

(56) References Cited

U.S. PATENT DOCUMENTS

| 5,813,862 A | 9/1998 | Merzenich |
| 7,676,372 B1 | 3/2010 | Oba |
| 8,781,836 B2 * | 7/2014 | Foo .................. G10L 21/02 704/258 |
| 10,791,404 B1 | 9/2020 | Lasky |
| 10,997,970 B1 | 5/2021 | Rafii |
| 11,410,684 B1 * | 8/2022 | Klimkov .................. G10L 25/78 |
| 2003/0040909 A1 * | 2/2003 | Ghali ..................... G10L 15/187 704/235 |
| 2015/0127349 A1 | 5/2015 | Agiomyrgiannakis |
| 2018/0125415 A1 | 5/2018 | Reed |
| 2021/0082408 A1 * | 3/2021 | Shechtman .......... G10L 15/1807 |

OTHER PUBLICATIONS

Riviere et al., "Unsupervised Pretraining Transfers Well Across Languages," ICASSP 2020—2020 IEEE International Conference on Acoustics, Speech and Signal Processing (ICASSP), Barcelona, Spain, 2020, pp. 7414-7418, doi: 10.1109/ICASSP40776.2020.9054548 (Year: 2020).*

Koenecke, Allison et al. "Racial disparities in automated speech recognition", https://www.pnas.org/doi/10.1073/pnas.1915768117; Mar. 23, 2020, PANAS vol. 117 No. 4 U.S.A.

(Continued)

*Primary Examiner* — Michelle M Koeth

(57) ABSTRACT

A hearing aid system presents a hearing impaired user with customized enhanced intelligibility speech sound in a preferred language while maintaining the voice identity of speaker. The system includes a neural network model trained with a set of source speech data representing sampling from a speech population relevant to the user. The model is also custom trained with a set of parallel or non-parallel alternative articulations, collected during an interactive session with user or algorithmically generated based on the hearing profile of the user or category of users with common linguistic and hearing profiles.

20 Claims, 8 Drawing Sheets

(56) References Cited

OTHER PUBLICATIONS

Oord, Aaron van den et al. "Wavenet: A Generative Model for Raw Audio"; https://arxiv.org/pdf/1609.03499.pdf Sep. 19, 2016.
Biadsy, Fadi et al "Parrotron: New Research into Improving Verbal Communication for People with Speech Impairments"; https://ai.googleblog.com/2019/07/parrotron-new-research-into-improving.html; Jul. 17, 2019.
Qian et al. "AUTOVC: Zero-Shot Voice Style Transfer with Only Autoencoder Loss"; https://arxiv.org/pdf/1905.05879.pdf, ICML Jun. 6, 2019.
"Speech Synthesis Markup Language"; SSML; https://www.w3.org/TR/speech-synthesis11; Sep. 7, 2010.
Variani et al. "Deep Neural Networks for Small Footprint Text-dependent Speaker Verification"; Proc. ICASSP, IEEE international conference on acoustics, speech and signal processing, 2014.

\* cited by examiner

METHODS AND SYSTEMS FOR IMPROVING WORD DISCRIMINATION WITH PHONOLOGICALLY-TRAINED MACHINE LEARNING MODELS

PRIORITY CLAIM

Priority is claimed from applicant's U.S. patent application entitled METHODS AND SYSTEMS IMPLEMENTING PHONOLOGICALLY-TRAINED COMPUTER-ASSISTED HEARING AIDS, filed May 2, 2021, Application Ser. No. 17/246,673, and from U.S. provisional application titled METHODS AND SYSTEMS FOR IMPROVING WORD RECOGNITION WITH PHONOLOGICALLY-TRAINED MACHINE LEARNING MODELS, filed Jul. 30, 2021, application Ser. No. 63/227,853. Applicant incorporates said patent application by reference herein.

FIELD OF THE INVENTION

The invention relates to providing a hearing aid for hearing impaired users, and to methods to better tailor the hearing aid to the specific hearing needs of the users to yield speech in the speaker's voice having enhanced listening word discrimination and in their preferred language.

BACKGROUND OF THE INVENTION

The present disclosure is a novel solution to improve the clarity and intelligibility of voice communications using state-of-the-art machine learning, speech and natural language processing capabilities to correct for real time spectral interference, hearing loss, and indistinct tonal/interpretive data in a communications stream. The target users are people with sensorineural hearing loss, but the core technology has a more general applicability to improving verbal communications.

The intelligibility of speech and performance of automatic speech recognition systems (ASR) have been the subject of many studies. Google's Parrotron (https://ai.googleblog.com/2019/07/parrotron-new-research-into-improving.html, Jul. 17, 2019) strives to improve verbal communication for people with speech impairment and Koenecke et. al. (https://www.pnas.org/doi/10.1073/pnas.1915768117) study the racial disparities in the performance of automated speech recognition systems. The literature of voice conversion present methods to separate the linguistic content of speech from the voice content. Qian et. al. (https://arxiv.org/pdf/1905.05879.pdf, ICML 2019) propose a method of extracting the components of speech using information bottlenecks and Variani et. al. (IEEE international conference on acoustics, speech and signal processing, ICASSP, 2014) presents D-vector as a successful method of embedding speaker's voice identity. Speaker embedding encodes the speaker voice characteristics into a fixed-length vector using neural networks. A significant vocoder in the art includes Wavenet (Oord, et. al. https://arxiv.org/pdf/1609.03499.pdf, 2016) that can mimic any human voice.

The said compartmentation and embedding techniques have led to advances in altering the speech in many speech processing applications. The inventor's U.S. Pat. No. 10,997,970 discloses methods for a language-trainable computer-assisted hearing aids, and U.S. patent application Ser. No. 17/246,673 describes phonologically-trained computer-assisted hearing aids to improve human intelligibility of speech.

The present disclosure makes references to Speech Synthesis Markup Language (SSML) (https://www.w3.org/TR/speech-synthesis11) that is used for assisting the generation of synthetic speech in text to speech (TTS) services.

The focus of this disclosure is to address the speech clarity and word discrimination for a growing population with sensorineural hearing impairment using artificial intelligence (AI) neural network models that can be trained by an abundance of general speech corpuses while also customizing such models for a specific user or a category of users. Word discrimination is a score as how well a listener can correctly recognize the words in a speech. Thus a better word discrimination score indicates an enhanced speech intelligibility by the listener. The method includes characterizing speech intelligibility of a listener and using neural network tools to phonologically transform a general speech to an intelligible form customized to the listener while maintaining the natural vocal quality of the speaker.

The prior art solutions measure the sensorineural hearing loss of a person using a tone-based fitting process. The resulting audio spectrogram (audiogram) is used to compensate for the hearing loss in a hearing aid (HA) device by equalizing and magnifying the sound. The current HA devices have other features such as noise cancellation, voice isolation and communication with external streaming devices. While the current hearing aid solutions improve hearing conversational speech, they do not necessarily deal with improving the discrimination of speech derived from the contextual aspects of speech and higher level functions of hearing. Therefore when the sound magnification and equalization approaches the peak performance (i.e. not too loud to hurt ears or cause microphone feedback and not too low for hearing) a gap between speech hearability and word discrimination is reached. The present disclosure mitigates this conundrum and fills the performance gap. One aspect of understanding a conversation is a language prior that has been learned and gated through the auditory cortex of the brain. The language prior both complicates and at the same time assists the clarity of hearing. It complicates the hearing process and may cause cognitive dissonance because similar words may sound the same, and conversely it may assist in disambiguating the speech from the context. Thus, what is needed to further improve hearing are solutions that address the problem at word recognition level.

SUMMARY OF THE PRESENT INVENTION

Borrowing from the terminologies in the current hearing aid fitting process, the present novel solution consists of three phases with similar steps but very different details as follows: a) an algorithm-driven speech fitting phase for a custom data collection from a hearing impaired person; b) a prescription filling phase to use the data from the previous phase to train a machine learning speech transfer function that decodes the phonological representations of speech and encodes those features to assist the clarity of speech; and c) an inference module based on the output of the previous phases that is deployed in hearing aids and mobile streaming devices.

FIG. 1 illustrates the comparison of roughly parallel steps between the current commonly practiced process for fitting a hearing aid to the steps of the proposed approach in the present application. The term hearing aids is used as a general term for a device for improving the hearing of a listener either with or without hearing impairment. But for the explanation purposes, the focus shall be on users with some hearing loss who have the most issues with recognizing words in a common speech.

Referring to FIG. 1, column 101-1 depicts the steps in the commonly practiced prior art method under heading 'Current', and column 101-2 depicts the steps of the methods of the present disclosure under heading 'Proposed.'

Referring to FIG. 1, row 102 with caption 'Fitting' depicts the corresponding steps between 'Current' and 'Proposed' fitting examination methods. The term 'Fitting' here generally refers to the procedure to examine and collect data regarding the hearing ability of a particular user or perhaps a population of users with certain common hearing profile that may include sensorineural hearing loss, demographic, linguistic, regional or other relevant-to-hearing factors. Row 103 with caption 'Prescription' depicts the corresponding steps between 'Current' and 'Proposed' methods. The term 'Prescription' refers to the procedure to parameterize, shape and customize a solution for achieving a better hearing in response to the information collected in the prior 'Fitting' step. The term 'better hearing' can have a range of meanings for the user but more specifically it means achieving a better word recognition when listening to a common speech. Row 104 with caption 'Delivery' depicts the platform in which the customized solution from the prior 'Prescription' step is delivered to the user. The said form may refer to a device with different components including circuitry, software, algorithms and so on.

Referring to FIG. 1, block 102-1, in the fitting examination step of the current practices, an audiologist (or perhaps an automated application) performs a tonal test measuring the user's hearing ability by testing whether he/she hears a tonal beep sound at different intensity levels and different frequencies. The measured results can be shown in an audiogram, which is a graph-like plot of the user's hearing spectrum. The graph's x-axis is the beep frequency, and the y-axis is the sound level (or signal strength) in dB. Horizontal bands in the graph indicate hearing loss deviation from an optimal level. For instance, a user's hearing a 1000 Hz sound at 50 dB level may indicate a moderate hearing loss at mid-frequency. Hearing loss usually occurs at higher frequencies but can vary by user. Such audiology testing results can be used in designing prior art hearing aids to try to improve the user's hearing deficiencies. A user may have a hearing deficit in one ear or in both ears, but the deficit in each ear may differ. Thus as used herein, the term "ear" may include the term "ear(s)" in referring to use of a hearing aid in improving a user's hearing deficit.

Referring to FIG. 1, block 102-2, in the fitting examination step of the present disclosure instead or in addition of a tonal test, in an interactive session, different short words or sentence with varied utterances perhaps emphasizing different phonemes and syllables of the words are played to the user and feedback from the user are collected as which enunciation is the clearest. Preferably the words in the sentences are chosen so that during the total session a representative number of phonemes in the language are articulated in different language context. The volume of audio playback should be set at the minimum hearing level ability of the user so the choices are not overly influenced by the power of the audio signal. As explained further in the present disclosure, the process of selecting or synthetically generating different versions of sounding a word or a sentence can be automated and even guided by the hearing profile of the user.

Referring to FIG. 1, block 103-1, the prescription step in the current practices is essentially the design digital filters that implements the typical acoustic signal processing of the input sound signal including amplification, equalization and compression tailored to the user. Thus a chirping of a bird or the grinding feedback of chewing food are magnified as well as the ongoing conversation. The parameters of the amplification, equalization and compression components are designed commensurate with the sensorineural losses of ear as specified by the generated audiogram profile in the fitting examination step ('Audiogram' in block 102-1).

Referring to FIG. 1, block 103-2, the prescription step of the present disclosure is an artificial intelligence neural network model that uses the data generated from the prior interactive fitting stage ('Word discrimination' in block 102-2). The role of the model is to captures the transformation function of a speech from a general first articulation form to a second enunciation form that is better word-discriminated by the user. As further described in the present specification, the model is trained with a first set of general speech samples and then updated with a retraining with a second customized set of speech samples collected during the said examination session with the user.

Referring to FIG. 1, block 104-1, the delivery step in the current practices is in the form of a common tonal-based digital hearing aid device system that implements the acoustic transformation parameterized in prior step ('Design digital filters' in block 103-1).

Referring to FIG. 1, block 104-2, the delivery step of the present disclosure is a system that encapsulates the inference state of the trained model in the prior step ('Model training' in block 103-2).

In the remainder of this disclosure, further details of the key aspects of the invention are presented. The words 'recognition' and 'discrimination' are used interchangeably.

DETAILED DESCRIPTION OF THE PREFERRED EMBODIMENTS

The present disclosure is a voice conversion (VC) solution that transforms a speaker's speech to a form that is better word-discriminated or better recognized when heard by a person with a sensorineural hearing loss. Stated differently, the target speech characteristics are embedded in the latent states (or weights) of a deep learning neural network model that converts an utterance of a source speaker to conform to the said characteristics. There are fundamental differences between the present solution and the prior art VC methods. A typical VC model alters the speaker's voice. In this solution the speaker's voice identity is preserved. The target speaker in the prior literature is based on the voice characteristics of a real person. In the present solution, the target speaker is essentially a virtual entity whose time-variant speech characteristics are derived by characterizing the hearing profile of a listener with a hearing impairment during an interactive fitting examination session, and whose voice preserves the time-invariant present speaker's identity. Thus the transcript of the source speech is preserved and the morphological aspects of speech, such as the stress, timing and loudness of certain language morphemes or syllables, are adjusted to fit the listener's word discrimination ability.

In one embodiment, the methodology includes two stages of training and each stage comprises two models.

Figure 1:
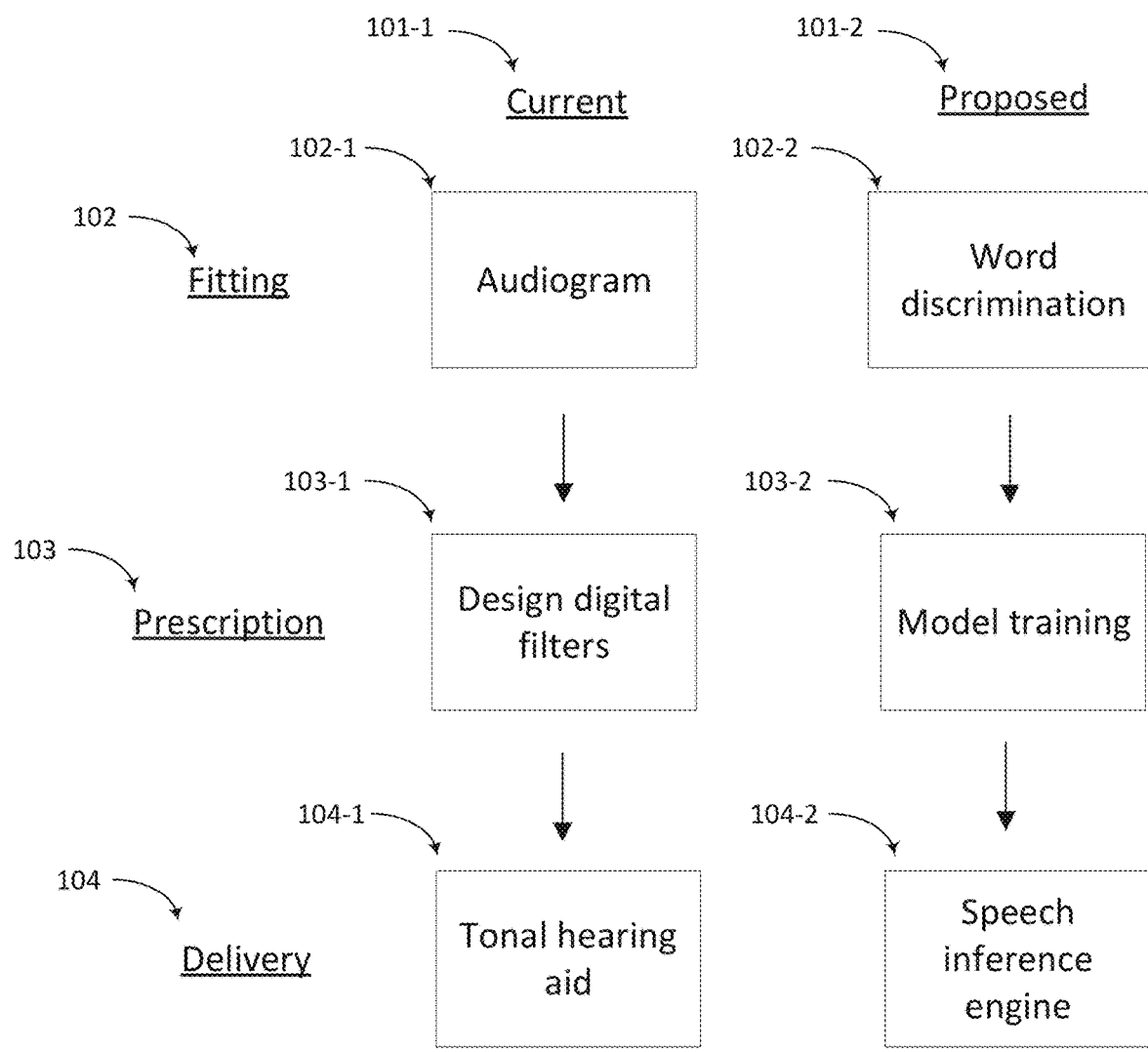
FIG. 1 compares the steps of the current practices for fitting a hearing aid with the process presented in this disclosure.
Figure 2A:
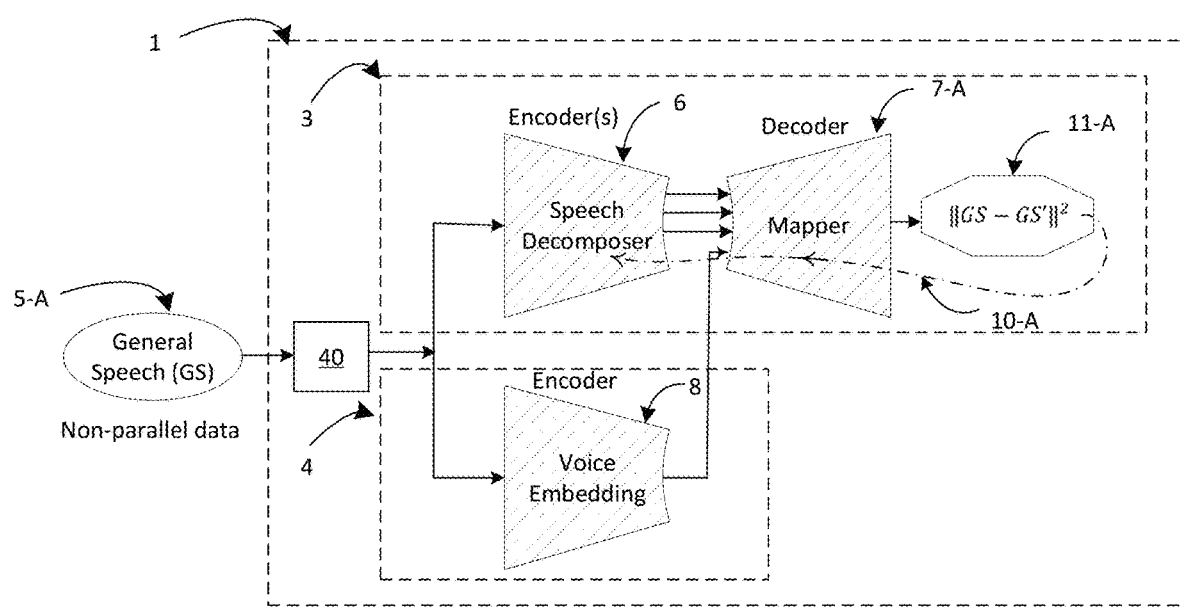
FIG. 2A illustrates a neural network model and the general training stage of the model with corpuses of general speeches.

In the first training stage (FIG. 2A, block 1) the model is trained once with corpuses of non-parallel general speeches (FIG. 2A, block 5A). The term non-parallel is defined as a contrast to parallel data where the latter requires a form of source and target speech pairs. For instance, in a voice conversion application, a speech segment in a first accent and the corresponding segment in a second accent comprise an example of a parallel data pair.

The first model (FIG. 2A, block 3) transforms its input to a target output speech. It has a deep learning auto-encoder structure to encode (FIG. 2A, module 6) the speech into its compartmented acoustic (e.g. pitch, timbre, rhythm and loudness) and higher level phonological (consonant phonemes and vowel phonemes) discriminative features. Thus the encoder can be thought of a number of encoders, each specializing in extracting a specific feature of speech. The decoder module (FIG. 2A, module 7-A) assembles the features of speech to reproduce its input. The decoder module is also referred to as the mapper in the literature of voice conversion. Let GS be an instance of a general speech articulation in a Mel-spectrum representation. Module blocks 40 in FIG. 2A, FIG. 2B and FIG. 2C encapsulate the transformation from a sound waveform to a Mel-spectrum. Using a Mel-spectrum transformation is a common practice in the art to represent a time series signal in frequency domain slices. The advantages of processing speech in frequency domain include the existence of fast algorithms and the compression of the signal. Let GS' be the predicted output of the model in the same representation. The loss function (FIG. 2A, module 11-A) evaluates how well the model reproduces its input (an error term) and the back propagation optimization (depicted by FIG. 2A, flow 10-A) updates the parameters of the entire model (i.e. both the encoders and decoder) to progressively reduce the error. In the process of such a training, the model learns to extract the salient aforementioned features of a general speech by different voices.

The second model (FIG. 2A, block 4) has another encoder module (module 8) for embedding the speaker's voice identity. Speaker embedding encodes the speaker voice characteristics into a fixed-length vector using neural networks. The embedded voice is used by the decoder (FIG. 2A, module 7A) to reconstruct the input speaker's (designated by GS) voice in the above auto-encoder model.

In the second training stage, the model (FIG. 2B, block 3-B and FIG. 2C, block 3-C) is trained with a custom training dataset. The first model in the custom training stage has similar encoders (FIG. 2B, module 6 and FIG. 2C, module 6) and decoder (FIG. 2B, module 7-B and FIG. 2C, module 7-C) designs as the corresponding modules in the general training stage (FIG. 2A, module 6 and module 7-A, respectively.) The role of the voice embedding encoder models (FIG. 2B and FIG. 2C, block 4) are the same as the corresponding module during the general training (FIG. 2A, block 4).

Figure 2B:
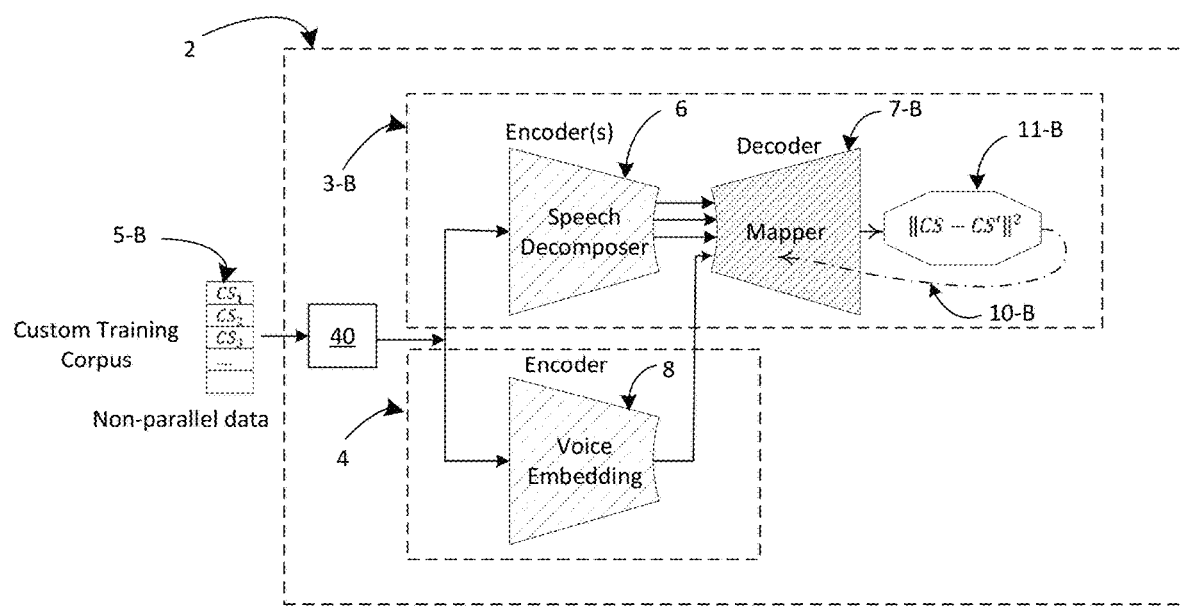
FIG. 2B and FIG. 2C illustrate at least two embodiments of the custom training stage of the model with a corpus of custom speeches.
Figure 2C:
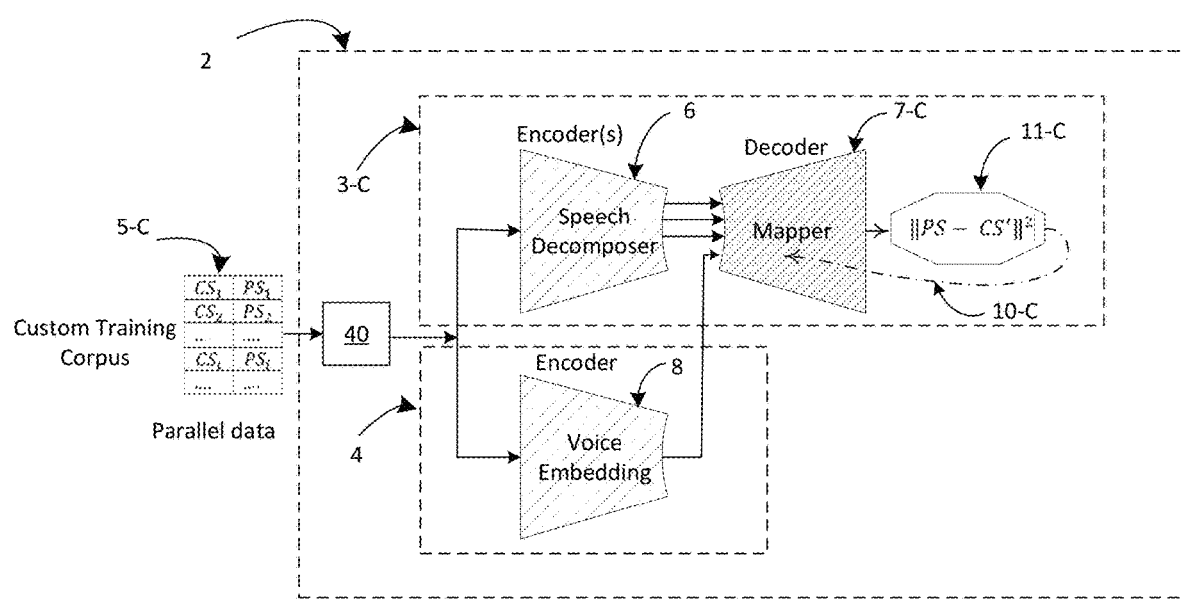

Module block 40 in FIG. 2B in the first embodiment of the custom training, and module block 40 in FIG. 2C in the second embodiment of the custom training encapsulate the transformation from an input sound signal time series to Mel-spectrum frequency domain representation.

In a first embodiment of the custom training, the first model (FIG. 2B, block 2) is trained with a set of non-parallel speech segment dataset. In a second embodiment of the custom training, the first model (FIG. 2C, block 2) is trained with a set of parallel speech segment pairs dataset. The custom speech segments is preferably collected in an interactive session with feedbacks from a target user as to which articulations are best word-discriminated by the user. The custom training set can also be automatically generated by a generator method guided by the audiogram of the user as explained further below.

The advantage of using non-parallel input in the first embodiment of the custom training is that the customary alignment issue between a source/target pairs is eliminated. The advantage of using parallel input in the second embodiment of the custom training is that the model is guided more forcefully to perform mapping from general speech to more specific preferred target speech.

In both embodiments of the custom training stage, the learned latent parameters of the model trained in the general training stage is transferred to the corresponding components of the custom training model at the initialization of the custom training stage. However, during the custom training, the parameters of the encoder modules (FIG. 2B, module 6 and FIG. 2C, module 6) are frozen. The purpose is to maintain the learned skills of the encoders to extract features of a general speech going forward. Technically, the back propagation optimization (depicted by Flow 10-B in FIG. 2B and Flow 10-C in FIG. 2C) of the neural network model only updates the parameters of the decoder modules (FIG. 2B, module 7-B and FIG. 2C, module 7-C) to progressively learns to extract the salient relevant aforementioned features of a general speech and map them to a style that is better word-discriminated by the target user at a de minimis hearing level.

In the first embodiment of the custom training method (FIG. 2B), the encoders (FIG. 2B, module 6) and decoder (FIG. 2B, module 7-B) components of the custom training model (FIG. 2B, block 2) is similar to the corresponding components of the model used in the general training. The non-parallel speech samples, denoted by input CS, from the custom training dataset (FIG. 2B, block 5-B) are used for training the model. Since the model is an auto-encoder mode, the predicted output of the model, denoted by CS', is guided to converge to the input by minimizing the loss function as expressed by $\|CS-CS'\|2$ (FIG. 2B, block 11-B). As noted before, during the custom training, the parameter relearning of the encoder modules are disabled. Thus, the model back propagation optimization (depicted by FIG. 2B, flow 10-B) updates only the parameters of the decoder (mapper) module to progressively reduce the mapping error without altering the encoding capability of the model for encoding general speech, and learning to map speech to a style that is better word-discriminated by the target user at a de minimis hearing level.

In the second embodiment of the custom training method (FIG. 2C), an input pair denote by i (FIG. 2C, block 5-C) consists of a first speech denoted by $CS_i$ and a second preferred speech denoted by $PS_i$ of the same transcript in preferably the same given voice. It should be noted that the word alignments between the two speeches may be trivially different as the transcripts are primarily the same. The first speech $CS_i$ in a pair i is a sample articulation from a prepared corpus of speeches for a custom training session. For instance, a female voice saying "What is your phone number." The second speech $PS_i$ in the pair i is preferably of the same transcript but said in a slightly different enunciation, and was ranked during an interactive data collection phase as better word-discriminated by the user. For instance, the second style was articulated the way a news announcer would articulate the same transcript, or perhaps it was articulated by a slightly different allomorph, or perhaps a different intonation, stress on a syllable or rhythm, and so on.

The custom training loss function $\|PS-CS'\|^2$, (FIG. 2C, module 11-C), where CS' is the predicted output of the model, evaluates how well the model maps an input articulation CS to the preferred target articulation PS and the back propagation optimization (depicted by FIG. 2C, flow 10-C) updates only the parameters of the decoder (mapper) module to progressively reduce the mapping error without altering the encoding capability of the model for general speech.

The second model of the custom training stage (FIG. 2B, module 8 and FIG. 2C, module 8) is similar to the corresponding model (FIG. 2A, module 8) and has another encoder module for embedding the speaker's voice identity.

Figure 3:
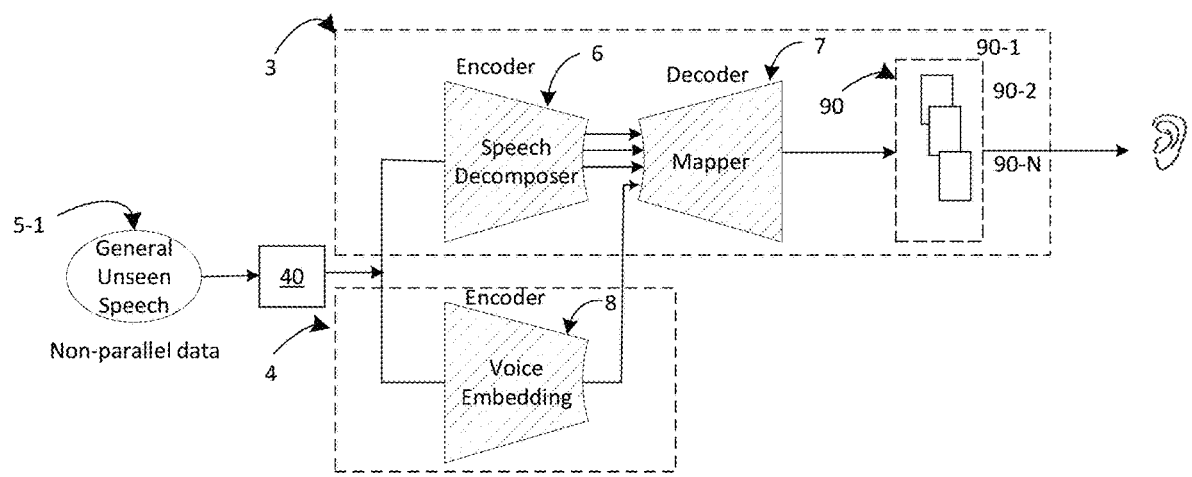
FIG. 3 depicts the interference stage of an embodiment of the present disclosure.

An embodiment of the inference stage of the solution after the general and custom training is depicted in FIG. 3. The inference model has a similar structure to the model used during the general and custom training. The capabilities learned during the training are transferred to the decoders (FIG. 3, module 6) and encoder (FIG. 3, module 7) of the inference model. Similarly, a pre-trained encoder (FIG. 3, module 8) is set up for the voice embedding.

The system host for the inference stage of the solution can be any of the typical voice processing devices such as hearing aids, mobile devices, teleconferencing applications, TVs and so on. Such a system typically comprises CPU, memory, a voice capture and generating components, power supplies, communication subsystems and so on.

Referring to FIG. 3, an aforementioned host system such as a hearing aid device continuously captures the voice of a new speaker with a microphone (Block 5-1). An algorithm (Module 40) feeds the slices of the input speech to the previously trained model. The input is split and directed to the first model (Block 3) and to the second model (Block 4). The encoders of the first model (module 6) extracts features of the input speech. The encoder of the second model embeds the voice characteristics of speaker to maintain the speaker's voice identity. The speech features and voice embedding are directed to the decoder module (Module 7) of the first model. The said decoder module transforms its collective input to a representation that is when converted back to a sound waveform (Module block 90) produces a speech that is better word-discriminated by the user while maintaining the voice identity of the speaker. Different forms of spectrum inverter or reverse transformations. e.g., modules 90-1, 90-2, . . . 90-N, may include without limitation inverse FFT, Griffin-Lim Algorithm (GLA), and fast GLA.

Figure 4:
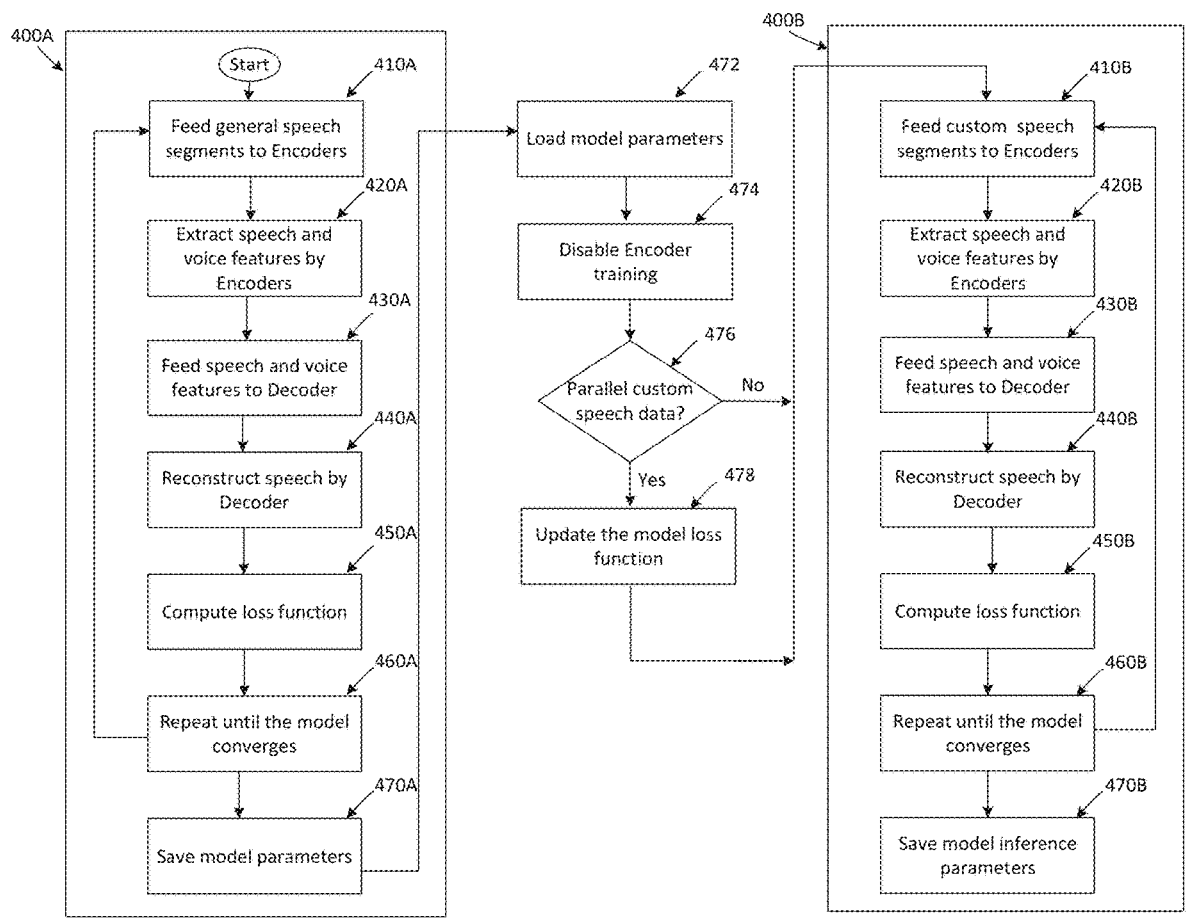
FIG. 4 depicts a flow diagram of an exemplary training procedure, according to embodiments of the present invention.

Recapping the steps of general and custom training method, FIG. 4 depicts an exemplary flow diagram of the training method of the model illustrated in FIG. 2A, FIG. 2B and FIG. 2C. In FIG. 4, Block 400A refers to the steps of the general training where the input data sample is from abundant non-parallel corpuses of general speech. Block 400B refers to the steps of a custom training where the training input data is samples from a speech corpus preferred by the user for having a higher word-recognition score. In one embodiment, the custom input training data is a set of parallel speech samples. In another embodiment, the custom input training data is a set of non-parallel speech samples.

Referring to FIG. 4, step 410A, the general training starts with inputting the non-parallel speech segments to the encoder modules of the model. In step 420A, the encoder modules extract the salient features of speech. Each encoder module specializes in extracting different discriminative features of speech by blocking the others. In step 430A, the feature are routed to the encoder module and the encoder module in step 440A re-assembles them and reconstruct a prediction of the input. The loss function in step 450A computes the error of the prediction. In step 460A, the parameters of the entire model are adjusted by their gradients and the input processing repeats until the model converges. After the model convergence, in step 470A, the parameters of the model is saved for the next phase of custom training.

Still referring to FIG. 4, the hand-over to the custom training begins with restoring the model parameters in step 472. In order to prepare for the next phase of training, in step 474, the adjustments of the parameters of the encoders portion of the model when processing a new input during the custom training is disabled. The purpose is to maintain the learned skills of the encoders to extract features of a general speech going forward. In step 478, a decision is made if the custom training samples are non-parallel data or pairs of parallel data. In the embodiment using parallel data, in step 478, the loss function of the model is adjusted to repurpose the model as a mapping from a source speech to a target speech. In the embodiment using non-parallel data, the model remains as an auto-encoder. In both cases, the custom training phase starts in step 410B.

Still referring to FIG. 4, block 4106, the custom training starts with inputting the custom speech samples to the encoder modules of the model. The remaining steps 420B, 430B, 440B, 450B and 460B are essentially the same as the corresponding steps 420A, 430A, 440A, 450A and 460A.

Finally, in FIG. 4, step 470B, the trained model parameters are saved as the weights for the inference phase of the solution (FIG. 3).

In yet another embodiment, a method to speed up the spectrum conversion (FIG. 3, block 90) is to maintain the phase of the input speech and recombine the phase using a reverse FFT spectrum converter in the said module (FIG. 3, block 90). The method can be applicable both if the input and output speech streams are word-aligned or word-aligned but with different speech lengths.

Figure 5:
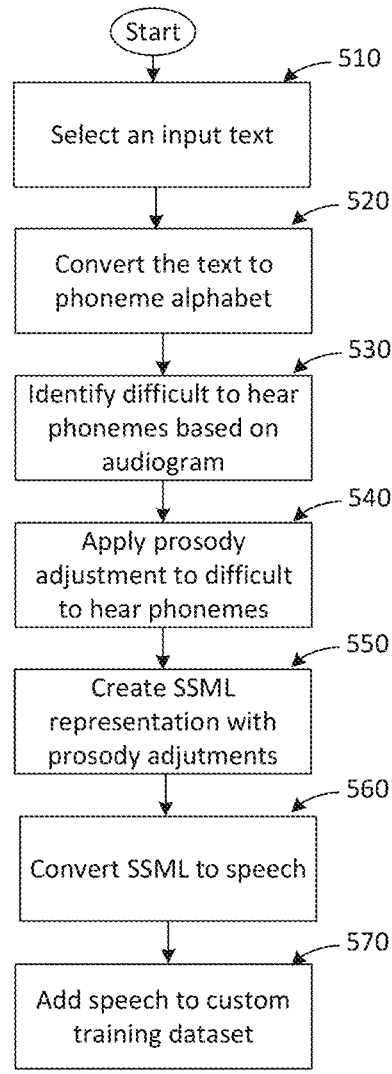
FIG. 5 depicts a flow diagram of an exemplary method for generating a custom training dataset.

The deep neural network model typically require collecting and labeling a large training dataset. The corpuses of available speeches provide an abundant volume of training dataset for the purposes of the general training. However, collecting and labeling a large custom training dataset from a user with sensorineural hearing impairment can be costly. In yet another embodiment of the present disclosure, FIG. 5 depicts a method to synthetically generate a potentially large dataset of a custom training speeches tailored to the hearing profile of a specific user or a category of users with similar hearing and word-recognition profiles. The said synthetically generated dataset can either replace or augment both parallel and non-parallel custom training datasets.

The process of synthetically generating custom training dataset is now described with reference to FIG. 5 blocks. At the start of the process, a sentence from a distribution of sentences preferably including commonly spoken words and similar-sounding words in the language of a user is selected as an input (Block 510). The alphabet of the text in the said language is converted to preferably International Phonetic Alphabet (IPA) https://en.wikipedia.org/wiki/International_Phonetic_Alphabet_chart) (block 520). IPA represents the way words sound in a given language and dialect. For instance, the text of sentence 'ask for water' may be converted to 'æsk for 'woter' in American English and to 'a:sk fo: 'wo:te' in British English in IPA. A word in the text can remain in the original alphabet if no sub-word sound adjustments are necessary. Since the target of the present process is to obtain an enunciation of the text that has highest clarity for the person with a hearing loss, certain information about the hearing profile of the user can be used in the following step (block 530). For instance, if the user has hearing loss in high frequencies, a common symptom for a majority of users with sensorineural hearing loss, the sound of letters such as 'f', 's' and 'th' may be difficult to recognize. For a person with a hearing loss in mid-to-high frequencies, the sound of letters 'sh', 'ch' and 'g' may be difficult to hear, or similar-sounding words like 'hear' and 'here' may be difficult to discriminate. The phonemes that include the sound of these letters are identified (block 530). Within the IPA text, certain adjustments may be made using suprasegmental symbols to adjust the prosody, pitch, length, stress, intensity, tone or germination of the expression of the text in the underlying language. Next, the text in IPA is included in a SSML format. Various SSML elements may be used to further control the expression of speech such as prosody pitch, rate, volume, emphasis, intonation, break and rhythm of phonemes and syllables (blocks 540 and 550). These steps are important because they also address recovering the sounds that the speaker may not articulate with a strong clarity in a common conversation and enhance the intelligibility of speech. As noted below, the parameter values of SSML elements can initially be adjusted by having a user in the loop and getting word recognition feedback. SSML also allows specifying different voices in the specification to increase the diversity of voices.

Still referring to FIG. 5 blocks, the next step converts the SSML representation of the input text to a speech with the specified voice (block 560). The conversion from SSML format to a good quality synthetic voice can be performed using many of the available online text-to-speech cloud services. Finally, the synthetic articulation is added the dataset of training files for the custom training stage as non-parallel samples. To produce parallel data, the method can be augmented by first selecting a sample of a corpus of general speech GS, converting the speech to a text, entering the text as input to the process (block 510), and designating the generated preferred speech as PS to create a pair of corresponding parallel speech training sample.

It should also be noted that the process illustrated in FIG. 5, can bootstrap with an iterative process of adding a target user in the loop at the beginning by automatically generating speech samples as described above, collecting the word-discrimination score of the user, adjusting the parameters of the generator (block 540), and then gradually detaching the user from the loop and continue generating potentially large body of custom training speech samples.

Figure 6:
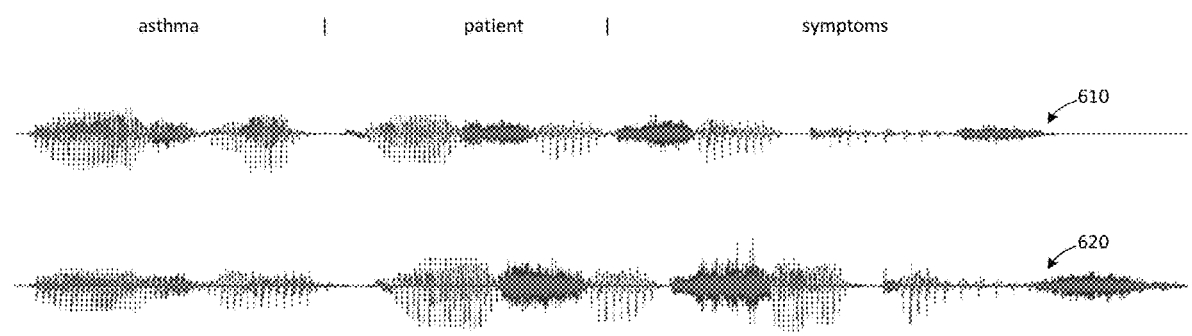
FIG. 6 illustrates the waveforms of generated training speech audios before and after applying an embodiment of the present disclosure for adjusting the underlying input text.

An example of a SSML representation of a sample text: 'asthma patient symptoms' using SSML elements according to the embodiment described in FIG. 5 process for an exemplary user case may appear as:
<prosody rate="+5%">asthma <emphasis level="strong"><phoneme alphabet="ipa" ph="peɪʃ

ə nt"></phoneme></emphasis><emphasis level="strong"><phoneme alphabet="ipa"ph="sɪmpt ə mz"></phoneme></emphasis></prosody>
wherein certain letters like 'p', 's' or sound of 'sh' in syllable 'ʃə n' are adjusted. Waveforms represent amplitudes of an audio sampled in time. The waveforms in FIG. 6 compares a graphical representation of the two audio generated before adjusting for phonemes (waveform 610) and after applying phonemes and SSML element adjustments (waveform 620). The target listener for whom the adjustments were designed, presumably scores a higher word discrimination listening to the latter audio than if the said adjustments were not made.

A hearing aid system according to embodiments of the present invention may be described as follows. The hearing aid system includes a processor system with microphone, speaker, amplifier, CPU, memory, and software routines stored in the memory and executable by the CPU to carry out operations of the hearing aid system. The hearing aid system comprise a first phase of collecting data to characterize the word discrimination ability of user, a second phase of training a neural network model having encoder modules and a decoder module, and a third phase of deploying the model in a hearing aid platform. In the first phase, speech samples from a corpus of general speech is played to a user with different articulations governed by the hearing profile of the user and those articulations with highest word discrimination score by the user are collected as a new custom training speech corpus. In this fashion a plurality of high-score (e.g. more than 85%) word discriminated articulations is created for the listener as a custom speech corpus. In the second phase, the neural network model in an auto-encoder mode is trained once with corpuses of general speech and a second time with the custom training corpus while the retraining of the encoders are disabled. In the third phase, the model trained in the second phase is deployed in a hearing aid platform to process an unseen speech and transform it to enable the listener to hear in real time a more intelligible version of the input speech signal than if the hearing aid system were not used.

Without loss of generality, a system according to embodiments of the present invention may also be built into in electronic platforms including a speaker system, a smart speaker, a smart headset, earbuds, mobile devices, virtual assistants with conversational interfaces, smart phone products and so on.

In summary, the methods and systems in accordance with the embodiments of the present invention assist in improving clarity of hearing speech for people with sensorineural hearing loss by characterizing how well people discriminate words in spoken language and providing appropriate contextual adjustments to the expression of a general speech in accordance with that characterization.

The methods and systems in accordance with the embodiments of the present invention were presented in the context of improving the word-discrimination ability of users with hearing impairment. However, the methods and systems are also applicable in other applications for better hearing recognition of oral conversations across different dialects, accents, online communication, teleconferencing, telemedicine, customer service, communication lines, broadcasting and so on.

What is claimed is:

1. A method to transform a naturally spoken speech from its original expression to another enhanced enunciation that improves the word discrimination as heard by a listener with sensorineural hearing impairment while preserving the content of speech, the method including the following steps:

(a) using an artificial intelligence neural network model having at least one encoder module with latent parameters and at least one decoder module with latent parameters in tandem to perform the transformation;

(b) training the artificial intelligence neural network model with speech input samples from at least one pool of general speech corpus until the encoder module becomes trained for encoding its input to constituent features of speech and the decoder becomes trained to assemble the features to reproduce the input to its original form, and designating the trained artificial intelligence neural network model as a general-trained model;

(c) preserving latent parameter states of the general-trained model and disabling relearning of the latent parameters of the encoder module of the general-trained model;

(d) retraining the general-trained model with speech input data from at least one custom speech corpus that is collected in advance by playing different enunciations of the same speech in an interactive session, and recording the enunciation ranked by the listener's feedback as being better word-discriminated, and organizing the speech input data in a set of parallel speech pairs wherein the first component of a pair is a sample from the at least one pool of general speech corpus and the second component is the enunciation that was ranked as better word-discriminated by the listener of the same sample;

(e) designating the retrained general-trained model as a custom-trained model trained to convert a general speech to a listener preferred enunciation of the same speech; and inputting an unseen input speech sample with an unseen voice into the custom-trained model which outputs to the listener an enhanced intelligibility enunciation output speech signal.

2. The method of claim 1, wherein the constituent features include at least one of acoustic and phonological discriminative features of speech.

3. The method of claim 1, wherein the enhanced intelligibility output speech signal substantially preserves voice identity of the unseen input speech signal.

4. The method of claim 1, wherein the different enunciations of the same speech are one of (i) enunciated by a person or (ii) synthetically generated by an algorithm.

5. The method of claim 1, wherein the custom speech corpus comprises one of (i) parallel speech samples or (ii) non-parallel speech samples.

6. The method of claim 4, wherein the custom speech corpus is generated with a texts to speech library service.

7. The method of claim 6, wherein the texts are in Speech Synthesis Markup Language (SSML) representation.

8. The method of claim 7, wherein the texts are expressed in at least one of (i) International Phonetic Alphabet (IPA) representation or (ii) the original underlying language alphabet.

9. The method of claim 8, wherein the texts in IPA representation are tagged with IPA suprasegmental symbols to adjust at least one of prosody, pitch, length, stress, intensity, tone and germination of language in accordance with the hearing profile of the listener.

10. The method of claim 7, wherein the included texts are adjusted with at least one of the SSML's elements including emphasis, pitch, break, speaking rate and volume to control the expression of generated speech in accordance with the hearing profile of the listener.

11. A system to transform a naturally spoken speech from its original expression to another enhanced enunciation that improves the word discrimination as heard by a listener with sensorineural hearing impairment while preserving the content of speech, the system including:

a processor system having at least a CPU, a memory, and at least one software routine stored in the memory and executable by the CPU to carry out processing of the input speech signal to produce the enhanced enunciation output speech signal;

(a) a first software routine, stored in the memory and executable by the CPU running an artificial intelligence neural network model having at least one encoder module with latent parameters and at least one decoder module with latent parameters in tandem to perform the transformation;

(b) a second software routine, stored in the memory and executable by the CPU training the artificial intelligence neural network model with speech input samples from at least one pool of general speech corpus until the encoder module becomes trained for encoding its input to constituent features of speech and the decoder becomes trained to assemble the features to reproduce the input to its original form, and designating the trained artificial intelligence neural network model as a general-trained model;

(c) a third software routine, stored in the memory and executable by the CPU, preserving latent parameter states of the general-trained model and disabling relearning of the latent parameters of the encoder module of the general-trained model;

(d) a fourth software routine, stored in the memory and executable by the CPU retraining the general-trained model with speech input data from at least one custom speech corpus that is collected in advance by playing different enunciations of the same speech in an interactive session, and recording the enunciation ranked by the listener's feedback as being better word-discriminated, and organizing the speech input data in a set of parallel speech pairs wherein the first component of a pair is a sample from the at least one pool of general speech corpus and the second component is the enunciation that was ranked as better word-discriminated by said listener of the same sample;

(e) designating the retrained general-trained model as a custom-trained model trained to convert a general speech to a listener preferred enunciation of the same speech;

inputting an unseen input speech sample with an unseen voice into the custom-trained model which outputs to the listener an enhanced intelligibility enunciation output speech signal.

12. The system of claim 11, wherein the constituent features include at least one of acoustic and phonological discriminative features of speech.

13. The method of claim 11, wherein the enhanced intelligibility output speech signal substantially preserves voice identity of the unseen input speech signal.

14. The system of claim 11, wherein the different enunciations of the same speech are one of (i) enunciated by a person or (ii) synthetically generated by an algorithm.

15. The system of claim 11, wherein the custom speech corpus comprises one of (i) parallel speech samples or (ii) non-parallel speech samples.

16. The system of claim 14, wherein the custom speech corpus is generated with a texts to speech library service.

17. The system of claim 16, wherein the texts are in Speech Synthesis Markup Language (SSML) representation.

18. The system of claim 17, wherein the texts are expressed in at least one of (i) International Phonetic Alphabet (IPA) representation or (ii) the original underlying language alphabet.

19. The system of claim 18, wherein the texts in IPA representation are tagged with IPA suprasegmental symbols to adjust at least one of prosody, pitch, length, stress, intensity, tone and germination of language in accordance with the hearing profile of the listener.

20. The system of claim 17, wherein the included texts are adjusted with at least one of the SSML's elements including emphasis, pitch, break, speaking rate and volume to control the expression of generated speech in accordance with the hearing profile of the listener.

* * * * *